United States Patent
Alliger

[11] 3,905,788
[45] Sept. 16, 1975

[54] GAS CLEANER
[76] Inventor: Howard Alliger, 38 E. Mall, Plainview, N.Y. 11803
[22] Filed: Mar. 6, 1974
[21] Appl. No.: 448,516

Related U.S. Application Data
[63] Continuation-in-part of Ser. No. 246,065, April 20, 1972, abandoned.

[52] U.S. Cl. .................. 55/489; 55/524; 55/527; 156/181; 210/490; 210/509
[51] Int. Cl.² .................................. B01D 25/22
[58] Field of Search ........... 55/485, 487, 489, 512, 55/524, 526, 527; 156/181, 182, 582; 161/55, 59, 93; 210/488–492, 499, 509

[56] References Cited
UNITED STATES PATENTS

| | | | |
|---|---|---|---|
| 2,554,814 | 5/1951 | Catlin et al. | 210/491 X |
| 2,711,828 | 6/1955 | Webb et al. | 210/489 |
| 2,820,985 | 1/1958 | Cresswell | 210/489 X |
| 2,910,763 | 11/1959 | Lauterbach | 156/181 X |
| 3,262,578 | 7/1966 | Dennis | 210/509 X |
| 3,391,050 | 7/1968 | Nebesar | 156/181 X |
| 3,543,940 | 12/1970 | Schmidt, Jr. | 210/490 |
| 3,713,875 | 1/1973 | Beyer et al. | 210/490 X |

Primary Examiner—Samih N. Zaharna
Assistant Examiner—Robert H. Spitzer
Attorney, Agent, or Firm—Kenneth S. Goldfarb

[57] ABSTRACT

A gas cleaner and method of making the same, which includes an assembly of screens arranged angularly with respect to each other and heated compressed together under conditions of temperature and pressure so that the assembly of screens will be of a thickness less than 40 percent of the original thickness and with the openings in the mesh not substantially reduced in size from the original mesh size of the plastic coated fiberglass from which the gas cleaner is constructed because only the plastic is deformed and that only at the points of interengagement. The fiberglass becomes prestressed because it is locked in position.

4 Claims, 7 Drawing Figures

GAS CLEANER

REFERENCE TO RELATED APPLICATION

This application is a continuation in part of application Ser. No. 246,065 filed Apr. 20, 1972 for FILTER CONSTRUCTION and now abandoned.

BACKGROUND OF THE INVENTION

1. Field of the Invention

This invention relates to a gas cleaner and to a method of making a gas cleaner.

2. Description of the Prior Art

In the past, various types of materials, including screens, labyrinth paths, various types of meshes, papers, and the like, have been employed as filters. These materials have been successful in filtering various types of liquids and gases in a manner so as to remove unwanted impurities. However, most filters of these materials quickly become clogged and filled because of the impurities in the material being filtered and because of the particular construction and materials heretofore employed, these filters cannot be easily cleaned so as to be capable of reuse.

SUMMARY OF THE INVENTION

The present invention gives rise to a gas cleaner which is of a particular construction and made from such material and in such manner as to be particularly resistant to corrosion, abrasion, and clogging while also permitting for simultaneous washing or ready rewashing and cleaning, and also of a particular construction as to insure a constricted labyrinth path for the fluid being cleaned in as small a volume as possible and being especially durable.

This gas cleaner is also highly effective for demisting and removing water droplets even in the sub-micron size range at low pressure.

The construction of this invention features the assembly of a plurality of at least one hundred screens arranged in abutting relationship with the meshes thereof being angularly aligned relative to each other to insure a labyrinth path and greater filtering surface. Because of the arrangement of the filter screens relative to each other at the angle to each, the assembly screens can be compressed to a greatly reduced thickness without the openings being significantly closed by the compression. Because the screens become bonded to each other during the compression only at points of contact thereof under suitable conditions of heat and pressure, the fiberglass within the deformed plastic becomes prestressed due to the differential cooling and the screen assembly as a unitary whole may be easily washed and cleaned. Since there are no "dead end" pockets and all mesh is washed continuously and equally, openings in the various meshes are not reduced significally in size and less pressure drop is achieved while the entire gas cleaner occupies much less space than prior art devices. Since the screens of the gas cleaner are prestressed from the compression, they are considerably strengthened and will resist distortion by the fluid flowing therethrough to a greater degree than previous filters.

Still further objects and features of this invention reside in the provision of a gas cleaner that is simple in construction, inexpensive to produce, especially desirable for nitric acid production, capable of a wide variety of uses and which is efficient in operation.

These, together with the various ancillary objects and features of the present invention, which will become apparent as the following description proceeds, are attained by this gas cleaner construction, a preferred embodiment of which is illustrated in the accompanying drawing, by way of example only, wherein.

DETAILED DESCRIPTION OF THE PREFERRED EMBODIMENT

Figure 1:
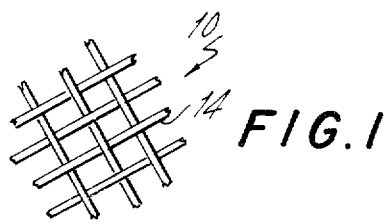
FIG. 1 is a plan view of a portion of a woven screen in accordance with the present invention.
Figure 2:
FIG. 2 is an enlarged vertical sectional view of a portion of a screen.
Figure 3:
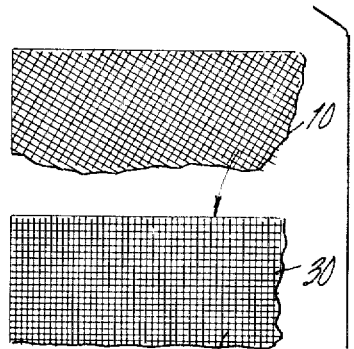
FIG. 3 is an exploded elevational view of some of the individual screens which are assembled to form the gas cleaner.

With continuing reference to the accompanying drawing, where in like reference numerals designate similar parts throughout the various views, reference numeral 10 is used to generally designate a screen utilized in the present invention. This screen includes a plurality of strands 14 which are woven to form a suitable mesh, the strands 14 being formed with a core 16 of fiberglass and a coating 18 of any suitable synthetic plastic may be employed. The filter generally indicated at reference numeral 20 includes not only a screen 10, but screens 30, 40, 50 and 60, etc. amounting to at least 100 and up to 500 screens. It is to be noted that the mesh of the screen 10 is aligned at a 30° angle with screen 40 which in turn is aligned at a 30° angle with respect to the screen 50 which likewise is aligned at a 30° angle with respect to the mesh of the screen 60 and form a composite assembly as indicated at 22.

Figure 5:
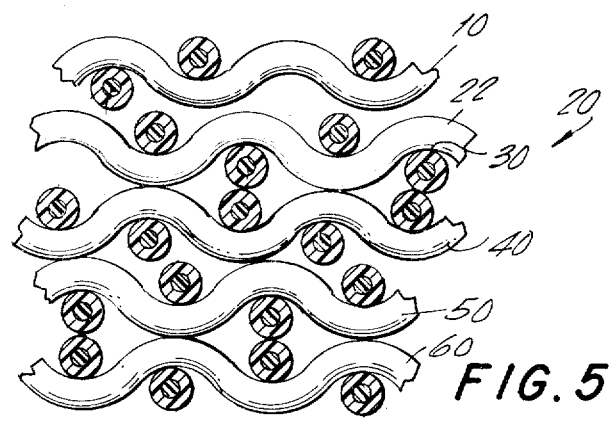
FIG. 5 is a vertical sectional view through an assembly of screens arranged in accordance with the present invention, prior to compression.
Figure 6:
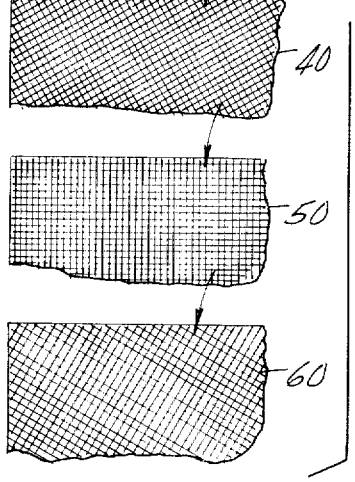
FIG. 6 is a view, similar to FIG. 5, but showing the screens after they have been compressed and bonded.
Figure 6:
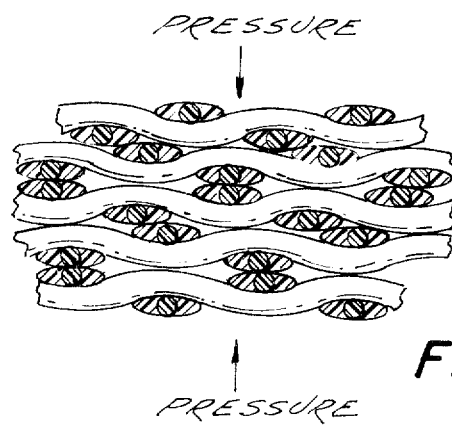
Figure 4:
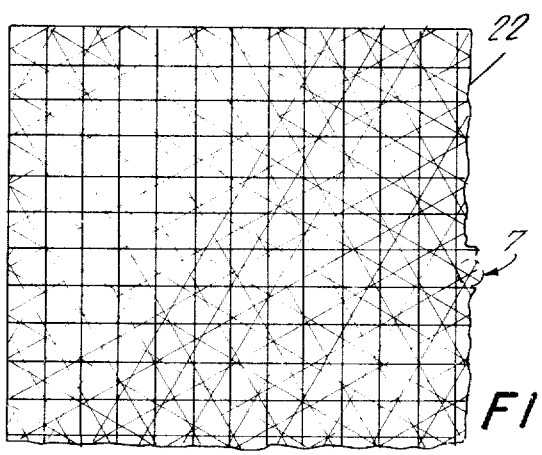
FIG. 4 is a plan view of the screens shown in FIG. 3, arranged in an assembly during one stage of manufacture thereof.
Figure 7:
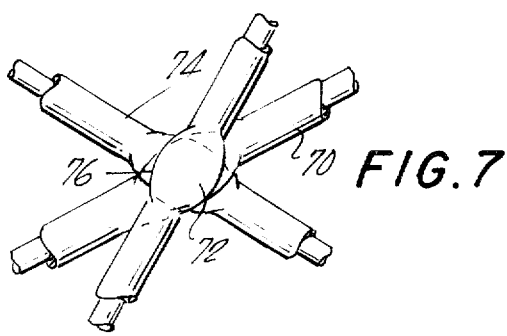
FIG. 7 is a partial view of contacting screens after bonding.

When the screens 10, 30, 40, 50 and 60 are from the same roll of screen mesh, the suitable angles to the axis of the roll may be cut as desired. After the screens 10, 30, 40, 50 and 60 are arranged in a vertical assembly as shown in FIGS. 4 and 5, suitable amounts of pressure are applied at the temperature ranging between 300°F to 400°F, preferably 350°F, and for at least 4 to 8 hours, to cause the synthetic plastic material of each screen to cohesively bond with the material of the adjacent and abutting screen at points of contact only causing deformations such as 72, 76 to strands such as 70 and 74. The pressure conditions of temperature are such that the screens become prestressed when cooled because of differential cooling and will remain bonded with the thickness of the screen after compression ranging between 20 percent to less than 40 percent of the thickness of the assembly prior to the application of pressure. The openings or spaces between the strands of each screen will be only slightly reduced in size because only the contacting parts of the screens will be deformed, and because of the angular arrangement of the screens, the assembled filter will be exceedingly strong and resistant to distortions in all directions, and because of the pre-stressed characteristics thereof will resist distortions during fluid flow while providing for a better labyrinth passage than heretofore achieved in unstressed screen assemblies. It has further been found that angular relationships of from 30° to 45° are best.

The gas cleaner is especially adaptable for filtering gaseous products of combustion resulting as industrial waste, removal of contaminants from air, as well as being equally adaptable for filtering of internal combustion engines, and filtering of oil and the like.

A latitude of modification, substitution and change is intended in the foregoing disclosure, and in some instances, some features of the present invention may be employed without a corresponding use of other features.

I claim:

1. A method of making a gas cleaner comprising the steps of arranging an assembly of a plurality of at least 100 screens having mesh openings and being of compressible plastic coated fiberglass material in superposed abutting relationship to each other with the mesh of the screens being aligned at an angle relative to the mesh of abutting screens, said screens being arranged with the mesh thereof at increments of substantially 30° to 45° in alignment relative to each other, then simultaneously applying heat and compressing said assembly of screens thereby flattening only the plastic of each of the screens only at their points of contact with the other abutting screens and completely bonding said screens to each other at all their points of mutual engagement and reducing the thickness of said assembly to less than 40 percent of the original thickness of said assembly of screens while not reducing substantially the size of said openings and deforming the plastic coating of said fiberglass material to prestress said fiberglass material so that said gas cleaner will resist distortion upon fluid flow.

2. A method of making a gas cleaner according to claim 1, wherein said assembly of screens is heated at a temperature ranging from 300° to 400°F for a period of 4 to 8 hours.

3. A method according to claim 1, wherein said assembly of screens is heated at a temperature reaching 350° for a period of 6 hours.

4. A gas cleaner comprising a plurality of at least 100 completely bonded screens of plastic coated fiberglass arranged in superposed abutting relationship to each other with the mesh of said screens being aligned at an angle relative to the mesh of each abutting screen, said screens being arranged with the mesh thereof at increments of substantially 30° to 45° in alignment relative to each other, said screens being compressed under stress and being deformed only at points of contact with said fiberglass being prestressed, the plastic of each of the screens being flattened only at their points of contact with the other abutting screens and said screens being bonded to each other at all their points of mutual engagement whereby the thickness of said assembly is reduced to less than 40 percent of the original thickness of said assembly of screens while prior to being compressed while the size of said openings is not reduced substantially and with the plastic coating of said fiberglass material being deformed to prestress said fiberglass material so that said gas cleaner will resist distortion upon fluid flow.

* * * * *